(12) United States Patent
Thomas et al.

(10) Patent No.: US 6,631,009 B1
(45) Date of Patent: Oct. 7, 2003

(54) AVOIDING DEADLOCK SITUATIONS IN A PRINTING SYSTEM USING A LOCKING TIME-OUT MECHANISM

(75) Inventors: Jennifer D. Thomas, Hermosa Beach, CA (US); David P. Nesbitt, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/404,171

(22) Filed: Sep. 24, 1999

(51) Int. Cl.[7] ............................................... G06F 15/00
(52) U.S. Cl. .................... 358/1.15; 358/1.12; 358/1.13; 709/102; 709/103
(58) Field of Search ........................... 358/1.1, 1.2, 1.5, 358/1.11, 1.12, 1.13, 1.14, 1.15, 1.16, 1.17, 1.18; 709/100, 101, 102, 103, 104

(56) References Cited

U.S. PATENT DOCUMENTS 6,212,544 B1 * 4/2001 Borkenhagen .............. 709/103

* cited by examiner

Primary Examiner—Mark Wallerson
(74) Attorney, Agent, or Firm—William W. Propp

(57) ABSTRACT

A document printing system involves multi-threaded processing of a document object. A deadlock situation between a preprocessing thread and a cancellation thread can be averted with a time-out locking mechanism. After the cancellation thread has locked the document object, its sets a cancel flag, then waits for preprocessing to complete. Meanwhile, the preprocessing thread may request a lock of the document object. If so, it will specify a maximum time-out period. After expiration of the time-out period, a timed-out status response will be sent from the document object to the preprocessing thread. The preprocessing thread will then poll the document object for a cancel flag. A cancel flag will be set on the document object only if the cancellation thread has requested the document object perform a cancellation operation. If there is no cancel flag, the preprocessing thread will again request a lock of the document object with a maximum time-out period. If there is a cancel flag, the preprocessing thread will send a cancellation complete signal to the document object.

8 Claims, 4 Drawing Sheets

AVOIDING DEADLOCK SITUATIONS IN A PRINTING SYSTEM USING A LOCKING TIME-OUT MECHANISM

BACKGROUND OF THE INVENTION

This invention relates generally to object locking in a distributed printing system. More particularly, this invention is directed to the use of a locking time-out mechanism to avoid deadlock situations in a distributed printing system.

Distributed printing systems provide the means to control and access various printers and to manage other related information remotely. There are print servers that use a single document manager based on the protocol of DPA ISO 10175 which streamline document processing and allow for minimization of unit manufacturing costs. Examples of such servers may be found in products made available by Xerox Corporation under the "Document Centre" product name.

The distributed printing system will preferably employ an implementation known as the ISO document processing architecture (DPA) standard as envisioned by ISO/IEC 10175. The DPA print system is based on a two level client-server model. Both print spooler and printer supervisor act as servers.

A print client accepts commands from the user, submits requests to the printing system, and receives and communicates responses from the printing system to the user. A print spooler is a server that accepts operations from print clients and schedules print jobs on its printer supervisors. A printer supervisor accepts requests from print spoolers to print jobs on its physical printers. The printer supervisor also accepts other requests from the print spooler and/or print client.

A DPA printing system prints jobs that can be made up of one or more documents. A job that resides in a printing system is realized as a job object that transitions through a set of job states. The documents that make up a job in a printing system are realized as a set of document objects which transition through a set of document states.

A process from anywhere in the system may send an action or operation to an object, requesting that the object perform a certain action upon itself. Depending upon the action requested in relation to the current state of the object, the object transitions itself to a predetermined state in which it performs a series of commands. Many requests transmitted to objects may cause the objects to initiate subsequent actions upon themselves and/or upon other secondary objects.

Objects in a system may be subject to locks, which restrict access to the object in order to preserve the integrity of the data or attributes associated with that object. Locking, or more generally the process of barring use of an object, is used in situations when more than one entity or user might try to access the same object at the same time.

In a multi-threaded environment, many users can read from or write to commonly accessed objects. Locking prevents simultaneous access to the same object.

It may be desirable to lock an object, perform the work required for the processing of that object, then unlock the object. In a multi-threaded system, when a thread or process intends to perform some action upon a given object, the thread generally acquires a lock on the object, then begins its operation. In the course of this operation, it may occur that another thread wants to perform some work upon the same object.

An operation can be invoked in this multiple threaded environment which competes against other normal job processing threads for the lock of the object. This can potentially cause deadlock situations in the distributed printing system.

A deadlock situation can occur in a multi-threaded printing environment when a first thread maintains a lock while waiting for a second thread to meet some condition; meanwhile the second thread cannot meet the condition until the first thread unlocks. Processing does not proceed on either thread.

It is an object of this invention to provide a means to avoid deadlock situations between processing threads in a distributed printing system.

SUMMARY OF THE INVENTION

This invention provides a document printing system involving multi-threaded processing of a document object. A deadlock situation between a preprocessing thread and a cancellation thread can be averted with a time-out locking mechanism. After the cancellation thread has locked the document object, its sets a cancel flag, then waits for preprocessing to complete. Meanwhile, the preprocessing thread may request a lock of the document object. If so, it will specify a maximum time-out period. After expiration of the time-out period, a timed-out status response will be sent from the document object to the preprocessing thread. The preprocessing thread will then poll the document object for a cancel flag. A cancel flag will be set on the document object only if the cancellation thread has requested the document object perform a cancellation operation. If there is no cancel flag, the preprocessing thread will again request a lock of the document object with a maximum time-out period. If there is a cancel flag, the preprocessing thread will send a cancellation complete signal to the document object.

Other aspects of the invention will become apparent from the following more detailed description, taken in conjunction with the accompanying drawings.

BRIEF DESCRIPTION OF THE DRAWINGS

The preferred embodiments of this invention will be described in detail, with reference to the following figures wherein.

DETAILED DESCRIPTION OF PREFERRED EMBODIMENTS

Figure 1:
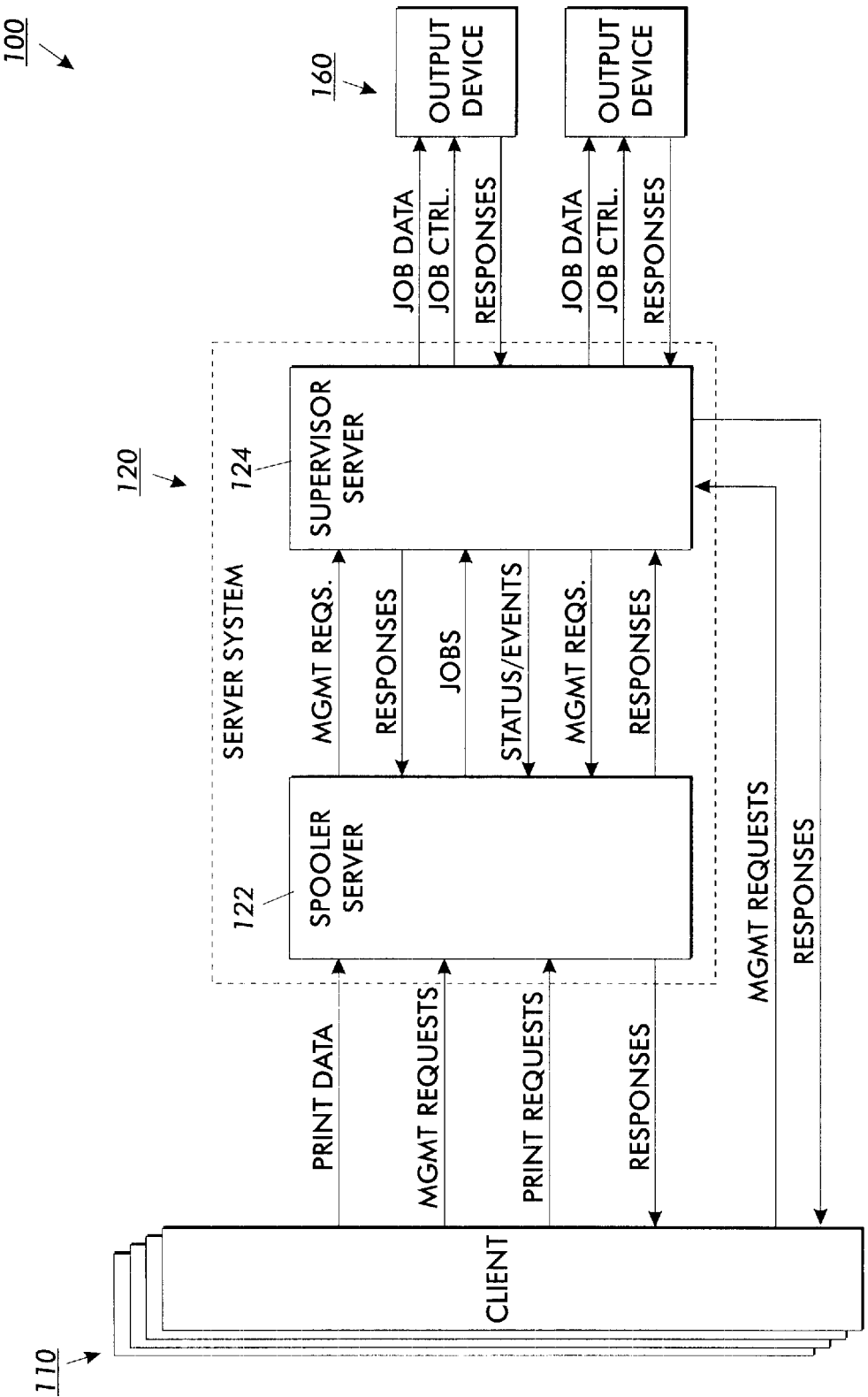
FIG. 1 is a schematic block diagram showing the interaction between the client, server and printer in the distributed printing system embodying the features of this invention.

Reference is now made to FIG. 1 illustrating the architecture of a client/server distributed printing system 100 of the present invention. The printing system 100 includes one or more clients 110, a general purpose computer system 120, which in this invention is preferably a server system, and one or more output devices 160. Each client 100 initiates print requests to print a specified file or files containing print data, and initiates management requests to manage printing systems, such as adding or deleting printers, canceling print requests and the like. The print data can include text or images created by an end user.

The server 120 receives print requests from the clients 110, either directly or via any other source of print requests, such as a storage disk. The print requests include print data for one or more documents as well as printing instructions. The server 120 performs actions required for each request operation and returns responses to the corresponding client 110. The server 120 organizes documents into print jobs. A document represents a single user file that is to be printed. A print job represents a collection of one or more documents that are printed as a unit. The print job includes instructions for printing (such as production and finishing), event notification, and response delivery. The server 120 is also responsible for sending job data and associated job control commands to the output device 160.

The client 110 is the interface between the user and the print management system 100. In a preferred system, implemented on a general purpose computer, the server 120 functions are split between two different server types, a spooler server 122 and a supervisor server 124.

In general, a spooler 122 takes print requests from multiple clients 110, converts the print requests into print jobs, schedules print jobs based on the print requests and then forwards the print jobs to a supervisor 124. The supervisor 124 provides the common interface between the spooler 122 and the output devices 160. The supervisor 124 takes the print jobs from the spooler 122 and invokes the designated printer to render the data. The spooler 122 can support multiple supervisors 124.

Each output device 160 is a physical device or hardware that is capable of rendering images, text or documents to produce a hard copy output of the print jobs received from the server 120. Output devices 160 can include, but are not limited to, printers, facsimile machines or pagers. However, as a non-limiting example, this disclosure refers to the output devices 160 as printers, for simplicity.

The supervisor server 124 delivers data to one or more of the output devices 160. The supervisor 124 receives the print jobs from the spooler 122, interprets the print jobs for print instructions and parameters, passes the print data, instructions and parameters to the appropriate output device 160, and handles any responses made by the output device 160.

The supervisor 124 receives client management requests that apply to print jobs forwarded to the supervisor, including those print jobs forwarded further to one of the output devices 160. The supervisor 124 also sends management requests to the spooler 122, such as a request for next job or a status update, for example, "job completed." The supervisor 124 also notifies the spooler 122 of events, such as canceling a print job in response to a "Job Cancel" management request from a user.

The client 110 may communicate directly with either the spooler 122 or the supervisor 124 regarding management requests. For example, the user may send a request to the supervisor 124 to modify the access control information, or an end-user may send a request to the supervisor 124 to see the current status of all the printers that the supervisor 124 manages.

When a print job and its corresponding documents enter the printing system, a job object and corresponding document objects are created in the server. In order for the job object and document objects to be printed, they are processed by the printing system and transition through various job and document states. Preprocessing involves operations and actions comprising one or more threads of execution upon the document object in preparation of printing.

A number of operations can be invoked while the job object and document objects are being processed (transitioning through the various job and document states). The integrity of job and document objects must be maintained at all times.

A locking mechanism applied to job and/or document objects is used to maintain this integrity by not allowing simultaneous access to the objects. Generally, locks may be applied to an object in order to control and deny access by other objects to the object. When an object is locked while work is being performed, subsequent operations may be requested which require a lock upon the same object.

Figure 2:
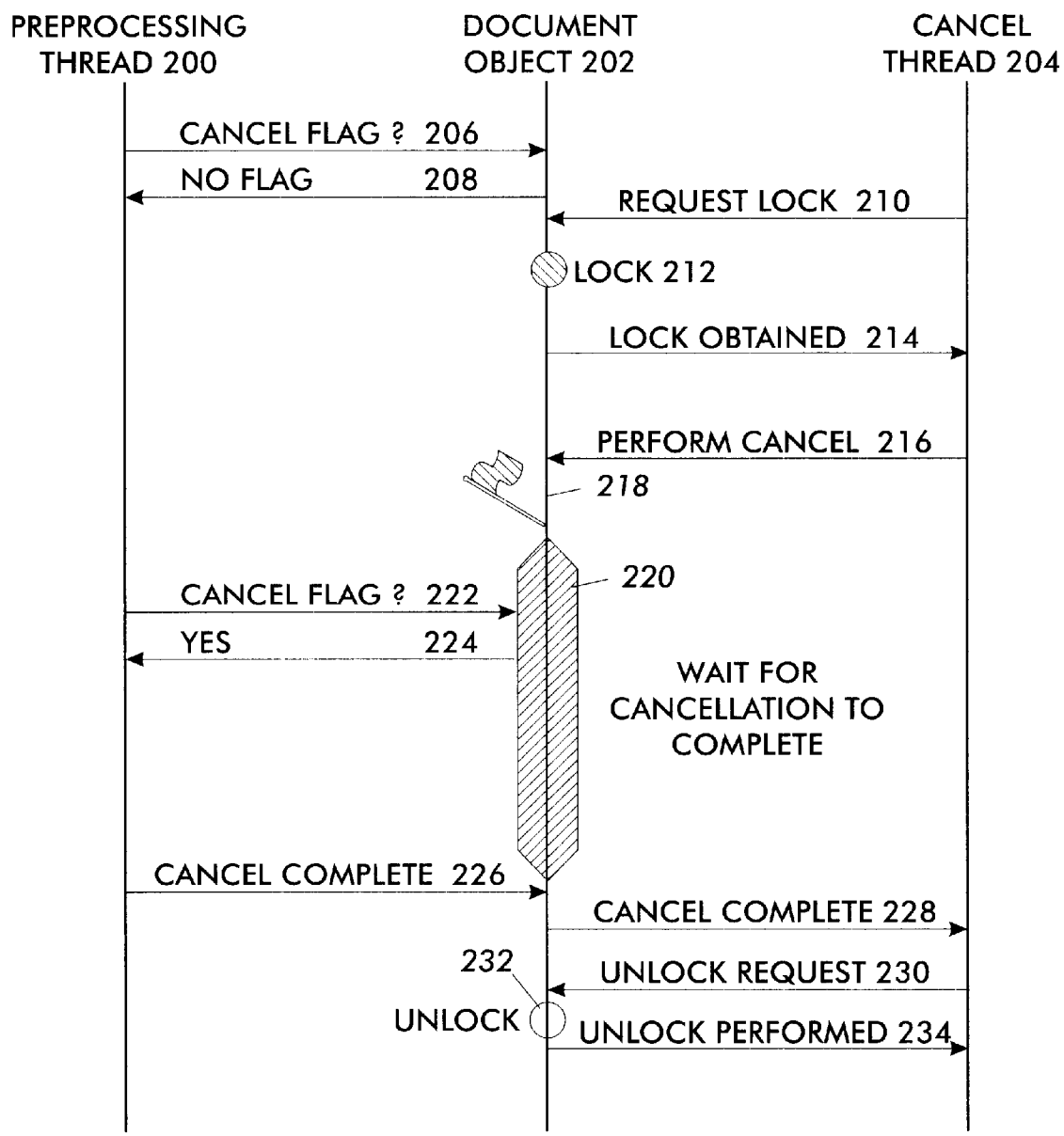
FIG. 2 is a schematic diagram of the preprocessing thread, a document object and a cancellation thread during a normal preprocessing and cancellation situation of the distributed printing system of FIG. 1 according to the present invention.

FIG. 2 shows a normal preprocessing thread cancellation situation among the preprocessing thread 200, the document object 202 and the cancel thread 204. The preprocessing thread checks 206 the document object for a cancel flag. The document object responds with a no flag response 208.

The preprocessing thread 200 does not check the document object 202 for a cancel flag on a regular time interval basis. Rather, the preprocessing thread does check the document object for a cancel flag before each phase of preprocessing by the thread on the document object.

The cancel thread 204 requests a lock 210 on the document object 202 in preparation of a cancel operation of the document object. The document locks 212 itself. The document sends a request 214 back to the cancel thread that a lock was obtained.

The cancel thread then requests 216 that the document object perform a cancel operation on itself. The document object detects that it is preprocessing so the document object sets a preprocessing cancel flag 218. The document object waits 220 for the preprocessing thread to detect the cancel flag and to complete cancellation of the preprocessing.

The preprocessing thread 200 again polls 222 the document object 202, checking the document object for a cancel flag 218. The document object responds with a cancel flag response 224 to the preprocessing thread.

The preprocessing thread notifies 226 the document object that cancellation of preprocessing is complete.

The document object 202 sends a cancel complete response 228 to the cancel thread 204.

The cancel thread sends an unlock request 230 to the document object.

The document thread unlocks 232 itself. The document thread sends an unlock performed response 234 to the cancel thread.

Figure 3:
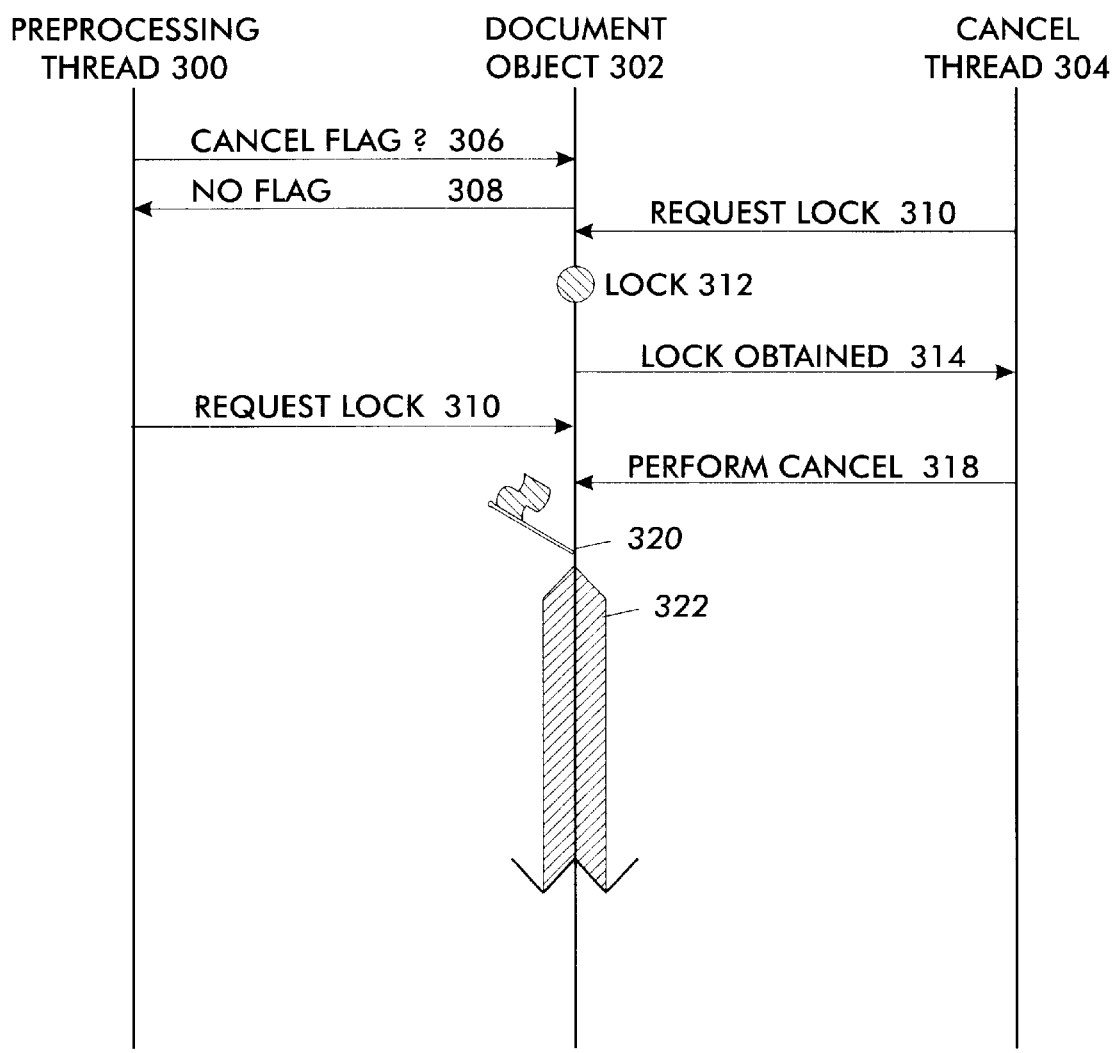
FIG. 3 is a schematic diagram of the preprocessing thread, a document object and a cancellation thread during a deadlock situation of the distributed printing system of FIG. 1 according to the present invention.

FIG. 3 shows a deadlock situation among the preprocessing thread 300, the document object 302 and the cancel thread 304. The preprocessing thread checks 306 the document object for a cancel flag. The document object responds with a no flag response 308.

The preprocessing thread does not check the document object for a cancel flag on a regular time interval basis. Rather the preprocessing thread does check the document object for a cancel flag before each phase of preprocessing by the thread on the document object.

The cancel thread requests 310 a lock on the document object in preparation of a cancel operation of the document object. The document locks 312 itself. The document sends back to the cancel thread that a lock was obtained 314.

The preprocessing thread 300 requests 316 a lock on the document object 302 in preparation of a processing operation of the document object. The document is unable to lock itself because of the previous lock 312 obtained by the cancel thread 304.

The cancel thread then requests 318 that the document object perform a cancel operation on itself. The document object detects that it is preprocessing so the document object sets a preprocessing cancel flag 320. The document object waits 322 for the preprocessing thread to detect the cancel flag and to complete cancellation of the preprocessing.

A deadlock occurs at this point. The request lock 316 on the document object 302 from the preprocessing thread 300 is waiting for a lock while the cancel flag 320 on the document object 302 from the cancel thread 304 is waiting for preprocessing to cancel.

Between checks, the preprocessing thread 300 will attempt to perform certain operations involving the document object. To do so, it may at some point request a lock on document object. Unfortunately, in the cancel scenario, the cancel thread 304 locks 312 the document object 302. The cancel thread 304 intends to hold the lock 312 until preprocessing completes. Preprocessing will never complete, because the preprocessing thread is currently blocked, waiting for the document lock.

The deadlock during the performance of an action request is merely an illustrative example.

Figure 4:
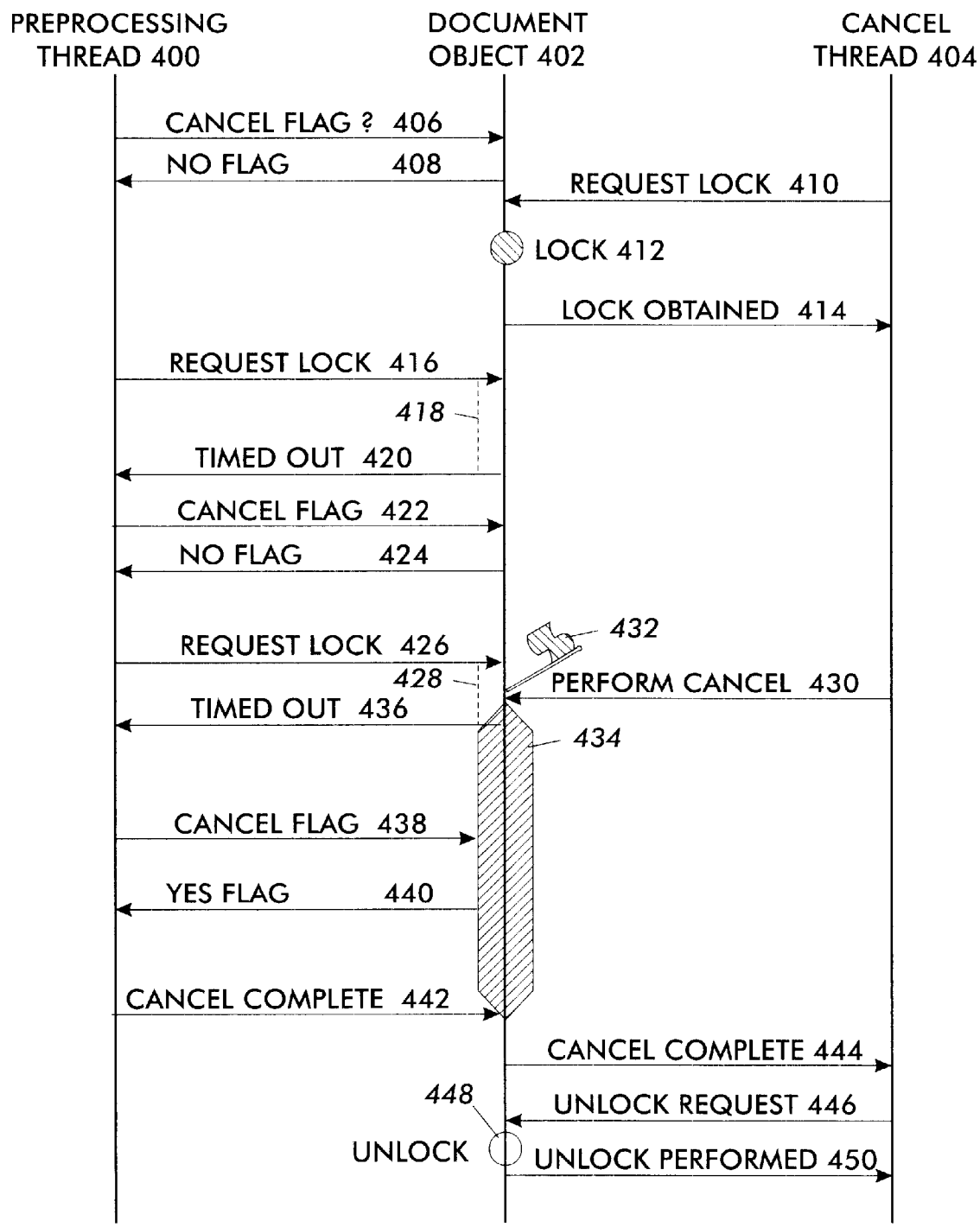
FIG. 4 is a schematic diagram of the preprocessing thread, a document object and a cancellation thread with a locking time-out mechanism to avoid deadlock of the distributed printing system of FIG. 1 according to the present invention.

FIG. 4 shows a locking time-out mechanism to avoid a deadlock situation among the preprocessing thread 400, the document object 402 and the cancel thread 404. The preprocessing thread checks 406 the document object for a cancel flag. The document object responds with a no flag response 408.

The preprocessing thread does not check the document object for a cancel flag on a regular time interval basis. Rather, the preprocessing thread does check the document object for a cancel flag before each phase of preprocessing by the thread on the document object.

The cancel thread requests a lock 410 on the document object in preparation of a cancel operation of the document object. The document locks itself 412. The document sends back to the cancel thread that a lock was obtained 414.

The preprocessing thread requests 416 a lock on the document object in preparation of a processing operation of the document object. The document is unable to lock itself because of the previous lock 412 obtained by the cancel thread.

The preprocessing thread has specified a maximum time-out period 418 for the locking request. If the time-out is exceeded, the document object 402 sends back to the preprocessing thread that timed out status 420 occurred for the locking request.

After receipt of the timed out status response 420 from the document object, the preprocessing thread polls 422 the document object, checking the document object for a cancel flag. If the document responds 424 with that there is no cancel flag, then the preprocessing thread again requests 426 a lock on the document object in preparation of a processing operation of the document object, again specifying a time-out period 428.

The preprocessing thread will repeat the attempted locking (with time out period) and cancel flag polling until the document locks itself and responds with the appropriate confirmation of a lock to the preprocessing thread or until the document sees a cancel flag and responds with the appropriate cancellation response to the preprocessing thread. Thus a potential deadlock situation can be averted.

If a cancel flag has been set on the document, then the document object responds with a cancel flag response to the preprocessing thread. The preprocessing thread will not attempt to lock the document, but instead will halt preprocessing.

After obtaining the lock 412 and the lock obtained response 414, the cancel thread 404 then requests 430 that the document object perform a cancel operation on itself. The document object detects that it is preprocessing so the document object sets a preprocessing cancel flag 432. The document object waits 434 for the preprocessing thread 400 to detect the cancel flag 432 and to complete cancellation of the preprocessing.

This cancel flag 432 was set during the time-out period 428 of the lock request 426 of the preprocessing thread 400. The lock request was made before the cancel flag was set so a timed out response 436 is sent to the preprocessing thread.

The preprocessing thread 400 again polls 438 the document object 402, checking the document object for a cancel flag 434. The document object responds with a cancel flag response 440 to the preprocessing thread.

The preprocessing thread halts preprocessing, then notifies 442 the document object that cancellation of preprocessing is complete.

The document object 402 sends a cancel complete response 444 to the cancel thread 404.

The cancel thread sends an unlock request 446 to the document object.

The document thread unlocks itself 448. The document thread sends an unlock performed response 450 to the cancel thread.

According to the present invention, a locking time-out mechanism can solve the cancel deadlock situation between two threads. The preprocessing thread, when attempting to lock a document object, can specify a maximum time-out period for the locking attempt. If that time-out period is exceeded and a lock has still not been obtained, the locking function will return to the preprocessing thread with a special (timed-out) status. If this happens, the preprocessing thread will poll the cancel flag, to see if a cancellation request needs to be processed. If a cancellation has not been requested, then the preprocessing thread will retry the object lock, again specifying a time-out period. It will repeat this behavior until a lock is obtained or until it detects a cancel request. If a cancellation has been requested, the preprocessing thread will not attempt to lock the document, but instead will halt preprocessing, then notify the document that preprocessing is completed. The document will receive the response and return to the cancel thread, which will unlock the document and continue. Thus, a potential deadlock situation can be averted by using a locking time-out mechanism for the preprocessing thread.

The use of preprocessing and cancellation threads is merely an illustrative example. A deadlock situation can occur in a multi-threaded printing environment when the normal job processing threads compete for the lock of job and/or document objects. Accordingly, a locking time-out mechanism can be used by any thread to prevent deadlock with any other thread. It is the use of a locking time-out mechanism to avoid a deadlock between an object requiring a lock and a condition which must be met before the lock will be released. If the condition may not be met without acquiring the same lock, a deadlock will occur.

Any processing entity in a printing system can avoid deadlock when requesting an object lock by also specifying a maximum time-out period. If the time-out period is exceeded, and the lock has still not been obtained, then the locking mechanism shall return to the processing entity so it can determine the next course of action. This solution can be used to solve the problem whereby one processing entity locks one or more objects and then notifies another processing entity that it must terminate, and the first processing entity must wait for the second processing entity to terminate before it can continue processing. If, before terminating, the second processing entity attempts to lock any of the objects that the first processing entity has locked, then a deadlock situation occurs.

As will be understood by those familiar in the art, the present invention may be embodied in other specific forms without departing from the spirit or central characteristics thereof. Although certain preferred embodiments have been shown and described, it should be understood that many changes and modifications may be made therein without departing from the scope of the appended claims.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for avoiding deadlock between multiple threads processing of a document object in a distributed printing system comprising:

sending a first lock request from a cancel thread to said document object, locking said document object in response to said first lock request, sending a second lock request with a maximum time-out period from a second processing thread to said document object, and either locking said document object in response to said second lock request or, after expiration of said time-out period, returning a timed out status response from said second lock request to said second thread.

2. The method for avoiding deadlock between multiple threads processing of a document object in a distributed printing system of claim 1 wherein after returning a timed out status response from said second lock request to said second thread, polling said document object for a cancel flag from said second processing thread.

3. The method for avoiding deadlock between multiple threads processing of a document object in a distributed printing system of claim 2 wherein after polling said document object for a cancel flag from said second processing thread, resending said second lock request with said maximum time-out period from said second processing thread to said document object if a no cancel flag response is sent from said document object to said second processing thread or sending a cancellation complete response from said second processing thread to said document object if a cancel flag response is sent from said document object to said second processing thread.

4. A printing system that distributes documents among a plurality of printers in a networked printing system comprising:

a spooler that receives documents and generates a print job from each document, a cancellation thread within said spooler, said first processing thread locking said document prior to processing said document, a second processing thread within said spooler, said second processing thread sending a lock request with a maximum time-out period to said document, such that said lock request either locks said document or, after expiration of said time-out period, returns a timed out status response to said lock request to said second processing thread, and a supervisor for forwarding said print job of said document from said spooler to said one of said plurality of printers for printing said document.

5. The printing system that distributes documents among a plurality of printers in a networked printing system of claim 4 wherein said first processing thread also sets a cancel flag on said document and said second processing thread polls said cancel flag after said lock request returns to said second processing thread.

6. A method for avoiding deadlock between multiple threads comprising:

sending a first lock request from a cancel thread to an object, locking said object in response to said first lock request, sending a second lock request with a maximum time-out period from a second thread to said object, and either locking said object in response to said second lock request or, after expiration of said time-out period, returning a timed out status response from said second lock request to said second thread.

7. The method for avoiding deadlock between multiple threads of claim 6 wherein after returning a timed out status response from said second lock request to said second thread, polling said object for a cancel flag from said second thread.

8. The method for avoiding deadlock between multiple threads of claim 7 wherein after polling said object for a cancel flag from said second thread, resending said second lock request with said maximum time-out period from said second thread to said object if a no cancel flag response is sent from said object to said second thread or sending a cancellation complete response from said second thread to said object if a cancel flag response is sent from said object to said second thread.

* * * * *